US012306589B2

(12) United States Patent
Cusin et al.

(10) Patent No.: US 12,306,589 B2
(45) Date of Patent: May 20, 2025

(54) FLEXIBLE HOROLOGICAL COMPONENT, PARTICULARLY FOR AN OSCILLATOR MECHANISM, AND HOROLOGICAL MOVEMENT INCLUDING SUCH A COMPONENT

(71) Applicant: Nivarox-FAR S.A., Le Locle (CH)

(72) Inventors: Pierre Cusin, Villars-Burquin (CH); Christian Charbon, Chezard-St-Martin (CH)

(73) Assignee: NIVAROX-FAR S.A., Le Locle (CH)

( * ) Notice: Subject to any disclaimer, the term of this patent is extended or adjusted under 35 U.S.C. 154(b) by 491 days.

(21) Appl. No.: 17/113,810

(22) Filed: Dec. 7, 2020

(65) Prior Publication Data

US 2021/0191335 A1 Jun. 24, 2021

(30) Foreign Application Priority Data

Dec. 20, 2019 (EP) .................................... 19219083

(51) Int. Cl.
*G04B 43/00* (2006.01)
*G04B 17/04* (2006.01)
(Continued)

(52) U.S. Cl.
CPC ......... *G04B 43/005* (2013.01); *G04B 17/045* (2013.01); *G04B 17/06* (2013.01); *G04B 17/32* (2013.01)

(58) Field of Classification Search
CPC .............................. G04B 17/06; G04B 43/005
See application file for complete search history.

(56) References Cited

U.S. PATENT DOCUMENTS 4,858,210 A * 8/1989 Yamada ............... G04B 13/023 968/94
8,066,925 B2 * 11/2011 Dodworth ........... B29C 37/0032 264/242

(Continued)

FOREIGN PATENT DOCUMENTS

CN 104025453 A 9/2014
CN 105843026 B 4/2018

(Continued)

OTHER PUBLICATIONS

Google search—nano wires solid or hollow—Aug. 31, 2023.*

(Continued)

*Primary Examiner* — Edwin A. Leon
*Assistant Examiner* — Jason M Collins
(74) *Attorney, Agent, or Firm* — Sughrue Mion, PLLC

(57) ABSTRACT

A flexible horological component for an oscillator mechanism of a horological movement, the component extending along a principal plane (P) and including at least a part made of a composite material (1), the composite material (1) including a matrix (2) and a multitude of nanotubes or nanowires (3) distributed in the matrix (2), the nanotubes or nanowires (3) being juxtaposed and disposed substantially parallel with an axis (A) substantially perpendicular to the plane (P) of the component, the matrix including a flexible filling material (4) to fill the interstices between the nanotubes or nanowires (3), the filling material (4) comprising at least in part a thermal compensation material wherein the thermoelastic coefficient (TEC) is of the opposite sign to that of the other materials of the composite material (1).

20 Claims, 2 Drawing Sheets

(51) Int. Cl.
*G04B 17/06* (2006.01)
*G04B 17/32* (2006.01)

(56) References Cited

U.S. PATENT DOCUMENTS

| | | | | |
|---|---|---|---|---|
| 2002/0167865 | A1* | 11/2002 | Tokoro | G04B 17/066 368/175 |
| 2005/0281137 | A1* | 12/2005 | Bourgeois | F16F 1/10 368/175 |
| 2007/0140065 | A1 | 6/2007 | Levingston | |
| 2009/0061240 | A1* | 3/2009 | Dodworth | B29C 37/0032 428/457 |
| 2010/0054090 | A1* | 3/2010 | Orny | G04B 18/006 368/175 |
| 2010/0214880 | A1* | 8/2010 | Rappo | G04D 3/0069 216/99 |
| 2014/0313866 | A1 | 10/2014 | Hessler et al. | |
| 2015/0185701 | A1* | 7/2015 | Tobenas Borron | C23C 16/40 427/419.7 |
| 2015/0344300 | A1* | 12/2015 | Hessler | G04B 17/06 216/33 |
| 2016/0349088 | A1 | 12/2016 | Patel | |
| 2017/0285573 | A1* | 10/2017 | Manousos | G04B 19/12 |
| 2018/0217561 | A1* | 8/2018 | Isshiki | G04G 9/0088 |
| 2018/0327919 | A1 | 11/2018 | Kim et al. | |
| 2018/0373202 | A1 | 12/2018 | Charbon | |
| 2019/0212702 | A1* | 7/2019 | Semon | G04B 17/066 |
| 2019/0271946 | A1* | 9/2019 | Hunziker | G04B 17/045 |

FOREIGN PATENT DOCUMENTS

| | | | |
|---|---|---|---|
| CN | 109212943 | A | 1/2019 |
| CN | 109716245 | A | 5/2019 |
| CN | 109960132 | A | 7/2019 |
| EP | 3 054 357 | A1 | 8/2016 |
| EP | 2 706 417 | B1 | 9/2016 |
| EP | 3 425 458 | A1 | 1/2019 |
| EP | 3 502 289 | A1 | 6/2019 |
| EP | 3 054 358 | B1 | 8/2019 |
| EP | 3 451 080 | B1 | 7/2020 |
| FR | 3 052 881 | A1 | 12/2017 |
| JP | 2007-533973 | A | 11/2007 |
| JP | 2015-501591 | A | 1/2015 |
| JP | 2017-205868 | A | 11/2017 |
| JP | 2018-193607 | A | 12/2018 |
| JP | 2019-7955 | A | 1/2019 |
| JP | 2019-518965 | A | 7/2019 |
| WO | 2013/064351 | A1 | 5/2013 |
| WO | 2014/006172 | A1 | 1/2014 |
| WO | 2014/006229 | A1 | 1/2014 |
| WO | 2016/199039 | A1 | 12/2016 |

OTHER PUBLICATIONS

European Search Report of EP 19 21 9083.3 dated Jun. 22, 2020.
Communication dated Nov. 15, 2021 from the China National Intellectual Property Administration in CN Application No. 202011510055.9.
Communication dated Aug. 10, 2021, issued by the Intellectual Property Office of India in application No. 202044054922.

* cited by examiner

FLEXIBLE HOROLOGICAL COMPONENT, PARTICULARLY FOR AN OSCILLATOR MECHANISM, AND HOROLOGICAL MOVEMENT INCLUDING SUCH A COMPONENT

CROSS REFERENCE TO RELATED APPLICATIONS

This application is claiming priority based on European Patent Application No. 19219083.3 filed on Dec. 20, 2019.

FIELD OF THE INVENTION

The present invention relates to flexible horological components, particularly for an oscillator mechanism of a horological movement with a positive thermoelastic coefficient.

The invention also relates to a horological movement including such a component.

BACKGROUND OF THE INVENTION

Horological movements generally comprise a barrel, an escapement mechanism and a mechanical oscillator mechanism. The escapement mechanism particularly includes a pallet assembly and an escapement wheel, whereas the oscillator mechanism comprises a spiral spring associated with an oscillating inertia-block referred to as a balance.

Technical progress in composite materials now enables certain components to be manufactured in innovative and high-performance materials, which enables, at least in part, metallic materials not to be used. At the present time, the use of nanotubes or nanowires, for example, for manufacturing components is being tried. Such materials with nanotubes or nanowires offer advantages in terms of light weight and strength. Thus, the document JP2008116205A describes a spiral spring comprising a graphite and amorphous carbon matrix, reinforced by carbon nanotubes which are dispersed in the matrix and aligned in the longitudinal direction of the spiral.

However, flexible components, for example resonators, are generally subject to deformations and modifications of the elastic properties thereof, which are due to temperature variation during the repetitive movements that they make. The variation of the frequency as a function of temperature in the case of a sprung-balance observes substantially the following formula:

$$\frac{\Delta f}{f}\frac{1}{\Delta T} = \frac{1}{2}\left\{\frac{\partial E}{\partial T}\frac{1}{E} + 3\cdot\alpha_s - 2\cdot\alpha_b\right\}$$

where:

$$\frac{\Delta f}{f}\frac{1}{\Delta T}$$

is me frequency variation as a function of temperature;

$$\frac{\partial E}{\partial T}\frac{1}{E}$$

is the variation of the Young's modulus as a function of temperature, i.e. the thermoelastic coefficient (TEC) of the balance-spring;

$\alpha_s$ the expansion coefficient of the balance-spring, expressed in ppm.° $C.^{-1}$;

$\alpha_b$ the expansion coefficient of the balance, expressed in ppm.° $C.^{-1}$ The deformations and modifications of the properties of the material induce a variation of the modulus of elasticity of the flexible component. However, these temperature-induced variations of the modulus of elasticity impede the precision of horological movements.

SUMMARY OF THE INVENTION

An aim of the invention is hence that of providing a flexible horological component, which avoids the problem cited above.

For this purpose, the invention relates to a flexible horological component for an oscillator mechanism of a horological movement, the component extending along a principal plane and including at least a part made of a composite material.

The component is remarkable in that the composite material comprises a matrix and a multitude of nanotubes or nanowires distributed in the matrix, the nanotubes or nanowires being juxtaposed and disposed substantially parallel with an axis substantially perpendicular to the plane of the component, the matrix including a flexible filling material to fill the interstices between the nanotubes or nanowires, the filling material comprising at least in part a thermal compensation material wherein the thermoelastic coefficient is of the opposite sign to that of the other materials of the composite material.

Thus, thanks to such a flexible component, it is possible to compensate for the modifications of the properties of the material, for example for a spiral spring, when the temperature varies. Indeed, the thermal compensation material having a thermoelastic coefficient of opposite sign to the other materials of the composite material, the variation of the modulus of elasticity of the compensation material occurs inversely to that of the deformation of the other materials of the component, which have a thermoelastic component of opposite sign. Thus, the performance of the component remains substantially the same, regardless of the temperature of use of the component, in particular in the case of significant temperature variation.

According to an advantageous embodiment, the thermal compensation material has a thermoelastic coefficient greater than 0. In this case, the thermal compensation material compensates for other materials having a thermoelastic coefficient less than zero.

According to an advantageous embodiment, the thermal compensation material includes silicon oxide SiO2, preferably predominantly, or even entirely.

According to an advantageous embodiment, the thermal compensation material includes Niobium, preferably predominantly, or even entirely.

According to an advantageous embodiment, the thermal compensation material forms an outer layer of the matrix, the outer layer preferably surrounding the matrix entirely.

According to an advantageous embodiment, the thermal compensation material is arranged directly on the nanotubes or nanowires.

According to an advantageous embodiment, the nanotubes are made of carbon.

According to an advantageous embodiment, the nanotubes are multi-walled.

According to an advantageous embodiment, the nanowires are made using an element to be selected from the following list: gold, silicon, silicon oxide, boron nitride, gallium nitride, silicon nitride, zinc oxide, gallium arsenide, tungsten sulphide, silver, copper, manganese arsenide, indium arsenide.

According to an advantageous embodiment, the nanotubes or nanowires have a diameter within a range ranging from 2 to 50 nm, preferably within a range ranging from 3 to 15 nm, or from 5 to 10 nm.

According to an advantageous embodiment, the nanotubes or nanowires have a length within a range ranging from 100 to 500 microns, preferably within a range ranging from 100 to 300 microns, or from 150 to 200 microns.

According to an advantageous embodiment, the filling material further comprises an element to be selected from the following list: silicon, tungsten, organic materials such as parylene, hexagonal boron nitride, Al2O3 type monocrystalline ruby, diamond, tungsten or molybdenum disulphides, graphite, lead, silicon carbide, nickel, indium phosphide, titanium oxide.

According to an advantageous embodiment, the component is a spiral spring of an oscillator mechanism, or a flexible blade guide of an oscillator mechanism.

The invention also relates to a horological movement comprising a flexible horological component according to the invention.

BRIEF DESCRIPTION OF THE DRAWINGS

Further features and advantages of the present invention will emerge on reading several embodiments given merely by way of non-limiting examples, with reference to the appended drawings wherein.

DETAILED DESCRIPTION OF PREFERRED EMBODIMENTS

Figure 1:
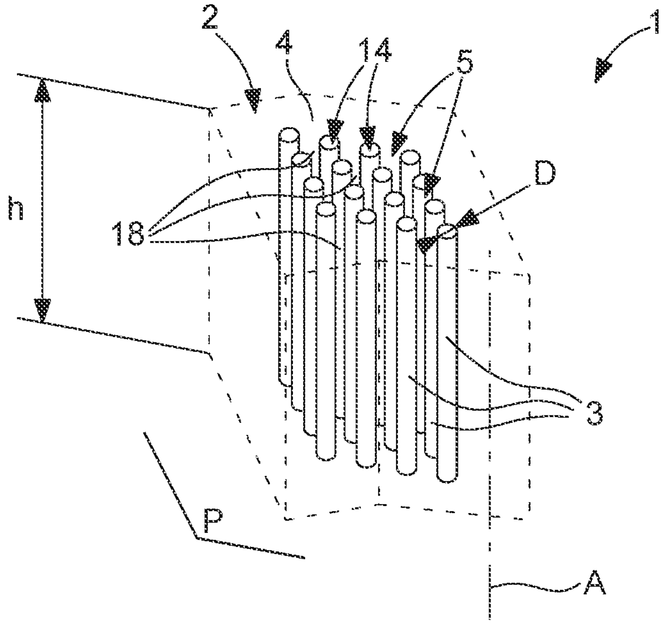
FIG. 1 schematically represents a through perspective view of a composite material according to a first embodiment of the invention, FIG. 2 schematically represents a through perspective view of a composite material according to a second embodiment of the invention, FIG. 3 schematically represents a perspective view of a balance equipped with a spiral spring of an oscillation mechanism, and FIG. 4 schematically represents a cross-sectional view of the composite material during the method for manufacturing the first embodiment of the invention.

In the description, we describe flexible components for a horological movement. The component is a flexible component to be selected from a list comprising for example an oscillator mechanism spiral spring or a flexible oscillator mechanism blade guide.

The flexible component is preferably flat and extends along a principal plane (P). The component includes at least a part made of a composite material 1 represented in FIG. 1. Preferably, the component is made entirely of this composite material 1. Thus, the components from the preceding list can be made of this composite material 1.

The composite material 1 comprises a matrix 2 and a multitude of nanotubes or nanowires 3 distributed in said matrix 2. The component has, for example, a substantially flat shape extending along a preferential plane P.

The nanotubes or nanowires 3 form a structure of the composite material 1, wherein they are juxtaposed and disposed substantially parallel with one another. The term nanotube denotes tubes wherein the inside is generally hollow, whereas nanowires are generally solid, i.e. one-piece.

The nanotubes or nanowires 3 are disposed substantially parallel with an axis A, perpendicular to the plane P of the component 1. They are evenly distributed so as to be spaced apart homogeneously in the matrix 2. Advantageously, the composite material is embodied such that nanotubes or nanowires 3 are present in the entire mass of the matrix 2.

The nanotubes or nanowires 3 have, for example, a diameter D within a range ranging from 2 to 50 nm. Preferably, the nanotubes or nanowires 3 have a diameter within a range ranging from 3 to 15 nm, or from 5 to 10 nm.

The nanotubes or nanowires 3 can have a length L within a range ranging from 100 to 500 microns. Preferably, the nanotubes or nanowires 3 have a length within a range ranging from 100 to 300 microns, or from 150 to 200 microns.

In a first embodiment, the composite material includes nanotubes 3 made of carbon. The carbon nanotubes 3 are generally multi-walled, but can also be optionally single-walled.

In a second embodiment, the composite material includes nanowires 3 made at least in part using a material to be selected from the following list: gold, silicon, boron nitride, gallium nitride, silicon nitride, zinc oxide, gallium arsenide, tungsten sulphide, silver, copper, manganese arsenide, indium arsenide.

The matrix 2 includes a filling material 4 to fill the interstices and join the nanotubes or nanowires 3 to one another. The material 4 can advantageously include the nanotubes or nanowires 3, by being injected into the interstices 5 between the nanotubes or nanowires 3. This material 4 helps provide cohesion between the nanotubes or nanowires 3 and thus modify the mechanical properties of all of the nanotubes or nanowires 3, in particular to render the matrix flexible. In the first embodiment of the nanotubes, the material 4 can also be arranged inside 14 the nanotubes 3.

The filling material 4 enables the flexibility of the component, the filling material 4 having elastic mechanical properties. Furthermore, a flexible component is obtained thanks to the geometric shape selected for the component. Thus, thanks to this flexible filling material 4, specific components of the horological mechanism can be embodied.

According to the invention, the filling material 4 comprises at least in part a thermal compensation material 18 wherein the thermoelastic coefficient (TEC) is of opposite sign to that of the other materials of the composite material (1).

The thermoelastic coefficient (TEC) is for example within a range ranging from 1 ppm/° C. to 100 ppm/° C.

The volume fraction and the thermoelastic coefficient of the thermal compensation material 18 are selected to compensate for the thermoelastic coefficient of the filling material 4. This choice can be made by calculation or empirically.

In a first alternative embodiment, the thermal compensation material 18 includes silicon oxide SiO2, preferably predominantly, or even entirely. The silicon oxide can be obtained by oxidising silicon. The silicon is deposited in thin layers, using known LPCVD type low-pressure vapour deposition techniques or by ALD type atomic layer deposition, by PECVD type plasma deposition, or indeed by epitaxial oriented growth. In this case, the thermoelastic coefficient of the thermal compensation material 18 is greater than zero, and enables materials wherein the thermoelastic coefficient is less than zero to be compensated for.

In a second alternative embodiment, the thermal compensation material 18 includes Niobium, preferably predominantly, or even entirely. Niobium is a transition metal which can be deposited using conventional known thin layer deposition techniques, such as PVD, CVD or ALD.

For both embodiments, the filling material 4 forming the matrix 2 can further comprise an additional element from the following list: tungsten, organic materials such as parylene, hexagonal boron nitride, Al2O3 type monocrystalline ruby, diamond, tungsten or molybdenum disulphides, graphite, lead, silicon carbide, nickel, indium phosphide, titanium oxide, or carbon. For example, the element of the filling material is Silicon, and the thermal compensation layer is silicon oxide.

In a first embodiment, represented in FIG. 1, the thermal compensation material 18 is arranged directly on the nanotubes or nanowires 3. The thermal compensation material 18 is infiltrated between nanotubes or nanowires 3 to cover same at least partially. If there is one, the element of the filling material 4 is also infiltrated between the nanotubes or nanowires 3 to cover the thermal compensation material 18. In this case, the composite material 1 is formed of the nanotubes or nanowires 3, the thermal compensation material 18 and the additional element of the filling material 4.

In the case of Niobium, the latter can be mixed with the element of the filling material 4, for example titanium, to form an alloy offering the thermal compensation properties according to the invention.

In a first alternative embodiment, the element of the filling material 4 is infiltrated between the nanotubes or nanowires 3, then is covered by the thermal compensation material. The thermal compensation material is also infiltrated between the nanotubes or nanowires, but is not directly in contact with the nanotubes or nanowires.

In a second alternative embodiment, only the thermal compensation material 18 is infiltrated between the nanotubes or nanowires to join them to one another and form the component. In this case, the filling material 4 is formed solely of the thermal compensation material, with no additional element. The composite material 1 is then formed by the nanotubes or nanowires 3 and by the thermal compensation material 18.

Figure 2:
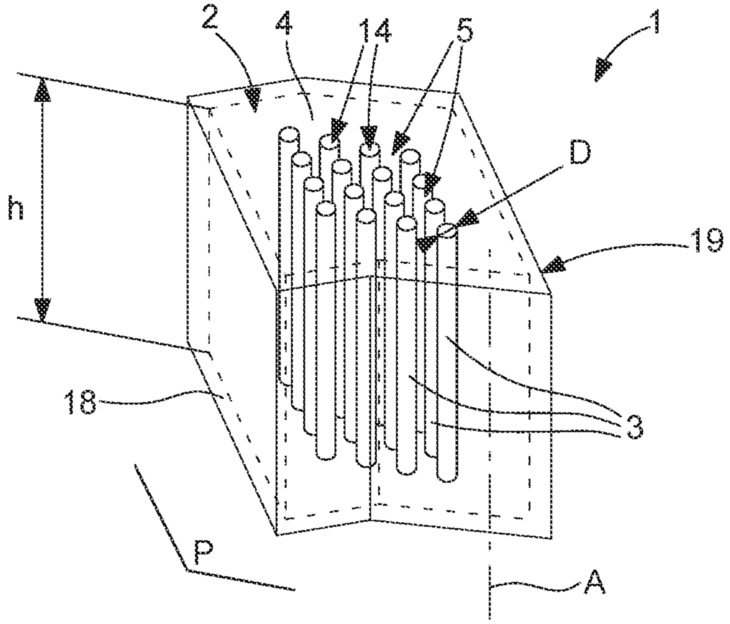

With reference to FIG. 2, in a second embodiment, the compensation material 18 forms an outer layer 19 of the matrix, the outer layer 19 preferably surrounding the matrix entirely, although it is possible to deposit a layer only on some faces. For this embodiment, the element of the filling material 4 is infiltrated between the nanotubes or nanowires 3 to form the core of the component, then a layer 19 of the thermal compensation material is deposited around the core to form the component.

The filling material 4 enables the flexibility of the component, the material 4 having flexible mechanical properties to enable an elastic deformation of the component. Furthermore, a flexible component is obtained thanks to the geometric shape selected for the component. The component is, for example, a spiral spring 6 of an oscillator mechanism 8 of a horological movement.

Thus, the horological components can benefit from the advantages of the composite materials based on nanotubes or nanowires, while retaining the essential properties for this type of component, for example for a spiral spring.

Figure 3:
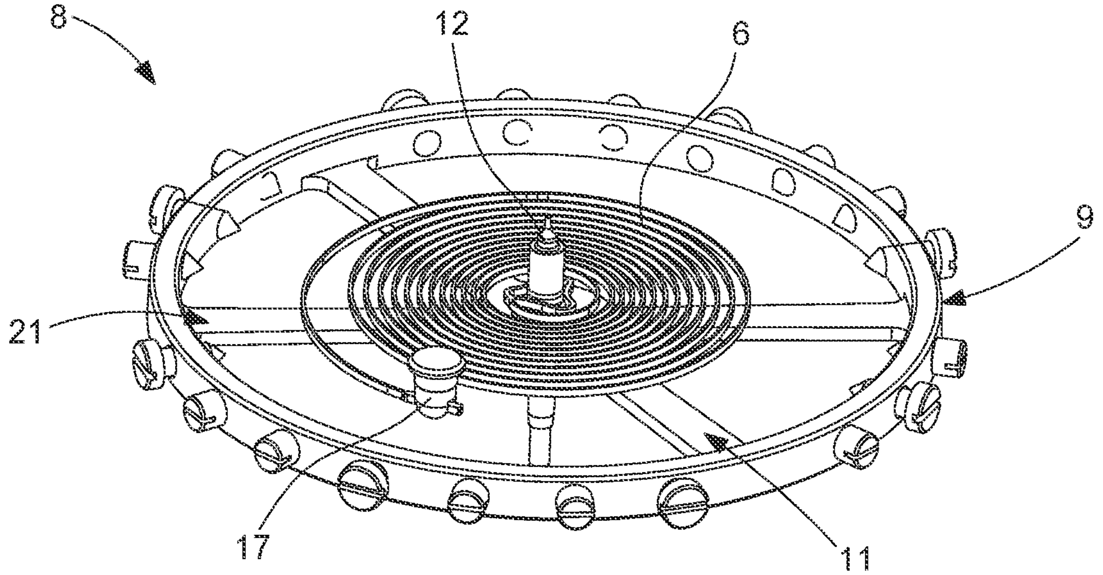

FIG. 3 represents a spiral spring 6 of a balance 8 made from such a flexible composite material. The spiral spring 6 is a narrow strip wound in an Archimedean spiral, such that there is a gap between the facing strip portions. Thus, by contracting and deforming the spiral, the desired spring effect is obtained. The balance 8 comprises a circular ring 9 and two rectilinear arms 11, 21 intersecting at the centre of the ring 9 and connecting two opposite sides of the ring 9. The arms 11, 21 hold a shaft 12 substantially perpendicular to the plane of the ring 9. The shaft 12 bears the spiral spring 6 in a plane parallel with that of the ring 9 by a first end. The second end is intended to be attached to another part 17 of the horological movement.

To manufacture the components, a method comprising the following steps is used, for example:

- a first step of preparing a substrate, for example a silicon substrate, preferably by photolithography, so that the nanotube or nanowire forest growth occurs at a specific location corresponding to the shape of the desired component. Thus, a flexible spiral or pivot shape is designed by photolithography.
- a second step of growing the nanotubes or nanowires on a substrate, not shown in the figures,
- a third step of inserting the constituent filling material of the matrix in the nanotube or nanowire distribution, and
- a fourth step of detaching the component from the substrate.

During the second step, the nanotubes or nanowires 12 are grown parallel with an axis substantially perpendicular to the substrate.

For carbon nanotubes, examples of the first and second steps are found in the document "Mechanical and electrical properties of carbon-nanotube-templated metallic microstructures" by Richard Scott Hansen (June 2012), or in the Senior Thesis by Collin Brown (22 Apr. 2014) of Brigham Young University entitled "Infiltration of CNT forests by Atomic Layer Deposition for MEMS applications".

Figure 4:
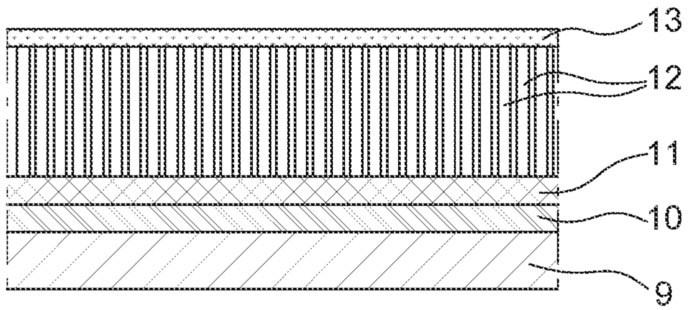

In FIG. 4, the substrate 9 is coated with a layer of silica 10, and a layer of catalyst 11, for example iron. The carbon nanotubes 12 are formed on the layer of catalyst 11 by growth.

Upstream from the second step, additional nanotubes can be mixed in a solvent and dispersed on the layer of catalyst, for example by ultrasound, to define a top layer of nanotubes. This top layer 13 of nanotubes is porous so that the carbon (or other material) forming the nanotubes 12 can be deposited therethrough, such that the nanotubes 12 grow under the top layer 13. Thus, regular and homogeneous growth of the nanotubes 12 is ensured so that they all have substantially the same length. The third step is also performed through the top layer 13 of nanotubes 12, thanks to the porosity thereof.

As regards the manufacture of the nanowires, conventional techniques associated with the material selected in the list are used. Thin layer deposition is preferably used, for example by CVD (Chemical Vapour Deposition) type chemical deposition or by PVD (Physical Vapour Deposition) type physical deposition. As in the first embodiment, photolithography methods are used to select the locations of a substrate, for example made of silicon, where the nanowires are grown. The flexible material is inserted between the nanowires. Finally, the component is detached from the substrate once it is complete.

International patent application WO 2014/172660 gives an embodiment example of silica nanowires. Silica nanowires have a thermoelastic coefficient greater than zero. Thus, the thermoelastic compensation material of the filling material must have a thermoelastic coefficient less than zero to compensate for the material of the nanowires.

Naturally, the invention is not limited to the embodiments described with reference to the figures and alternative embodiments could be envisaged without leaving the scope of the invention.

The invention claimed is:

1. A flexible horological component for an oscillator mechanism of a horological movement, the flexible horological component extending along a principal plane, the flexible horological component comprising:

a part made of a composite material, wherein the composite material comprises a matrix and a multitude of nanowires distributed in the matrix, the nanowires being juxtaposed and disposed substantially parallel with an axis substantially perpendicular to the principal plane of the flexible horological component, the matrix including a flexible filling material that fills interstices between the nanowires, the flexible filling material comprising at least in part a thermal compensation material wherein the thermoelastic coefficient (TEC) is of the opposite sign to that of the other materials of the composite material, wherein the nanowires have a diameter within a range ranging from 2 to 50 nm, and the thermal compensation material forms an outer layer of the matrix that surrounds the nanowires in at least directions perpendicular to the axis, or the thermal compensation material is arranged directly on the nanowires.

2. The flexible horological component according to claim 1, wherein the thermal compensation material has a thermoelastic coefficient greater than 0.

3. The flexible horological component according to claim 2, wherein the thermal compensation material includes silicon oxide SiO2.

4. The flexible horological component according to claim 2, wherein the thermal compensation material includes Niobium.

5. The flexible horological component according to claim 1, wherein the thermal compensation material forms the outer layer of the matrix.

6. The flexible horological component according to claim 1, wherein the thermal compensation material is arranged directly on the nanowires.

7. The flexible horological component according to claim 1, wherein the nanowires are made using an element to be selected from the following list: gold, silicon, silicon oxide, boron nitride, gallium nitride, silicon nitride, zinc oxide, gallium arsenide, tungsten sulphide, silver, copper, manganese arsenide, indium arsenide.

8. The flexible horological component according to claim 1, wherein the nanowires have a length within a range ranging from 100 to 500 microns.

9. The flexible horological component according to claim 8, wherein the length of the nanowires is within a range ranging from 100 to 300 microns.

10. The flexible horological component according to claim 9, wherein the length of the nanowires is within a range ranging from 150 to 200 microns.

11. The flexible horological component according to claim 1, wherein the flexible filling material further includes an element to be selected from the following list: silicon, tungsten, parylene, hexagonal boron nitride, Al2O3 type monocrystalline ruby, diamond, tungsten disulfide, molybdenum disulfide, graphite, lead, silicon carbide, nickel, indium phosphide, titanium oxide, and silicon.

12. The flexible horological component according to claim 1, wherein the flexible horological component is a spiral spring of an oscillator mechanism, or a flexible blade guide of an oscillator mechanism.

13. A horological movement, comprising the flexible horological component according to claim 1.

14. The flexible horological component according to claim 1, wherein the diameter of the nanowires is within a range ranging from 3 to 15 nm.

15. The flexible horological component according to claim 14, wherein the diameter of the nanowires is within a range ranging from 5 to 10 nm.

16. The flexible horological component according to claim 1, wherein the flexible filling material further includes an element to be selected from the following list: silicon, tungsten, parylene, hexagonal boron nitride, Al2O3 type monocrystalline ruby, diamond, tungsten, or molybdenum disulphides, graphite, lead, silicon carbide, nickel, indium phosphide, titanium oxide, and silicon, and wherein the thermal compensation material forms the outer layer of the matrix and is not within the interstices, and wherein the element is within the interstices.

17. The flexible horological component according to claim 1, wherein the flexible filling material further includes an element to be selected from the following list: silicon, tungsten, parylene, hexagonal boron nitride, Al2O3 type monocrystalline ruby, diamond, tungsten disulfide, molybdenum disulfide, graphite, lead, silicon carbide, nickel, indium phosphide, titanium oxide, and silicon, and wherein the thermal compensation material is arranged directly on the nanowires, and wherein the element covers at least portions of the thermal compensation material on the nanowires.

18. The flexible horological component according to claim 1, wherein the thermal compensation material forms the outer layer of the matrix that surrounds the nanowires in at least the directions perpendicular to the axis.

19. The flexible horological component according to claim 1, wherein the thermal compensation material fills the interstices between the nanowires.

20. The flexible horological component according to claim 1, wherein the thermal compensation material forms the outer layer of the matrix that surrounds the nanowires in at least the directions perpendicular to the axis, and the thermal compensation material is arranged directly on the nanowires.

* * * * *